United States Patent
Nobili et al.

(10) Patent No.: US 7,428,570 B2
(45) Date of Patent: Sep. 23, 2008

(54) PROCESS OF COMMUNICATION BETWEEN AN APPLET AND A LOCAL AGENT USING A SOCKET COMMUNICATION CHANNEL

(75) Inventors: Johanna Nobili, Gassin (FR); Olivier Nobili, Gassin (FR); Keith Ross, Valbonne (FR); Bruno Van Haetsdaele, Le Mesnil-Aubry (FR)

(73) Assignee: Wimba.Com S.A., Sophia-Antipolis (FR)

( * ) Notice: Subject to any disclaimer, the term of this patent is extended or adjusted under 35 U.S.C. 154(b) by 962 days.

(21) Appl. No.: 10/181,021

(22) PCT Filed: Dec. 26, 2000

(86) PCT No.: PCT/EP00/13353
§ 371 (c)(1),
(2), (4) Date: Jul. 2, 2002

(87) PCT Pub. No.: WO01/50258
PCT Pub. Date: Jul. 12, 2001

(65) Prior Publication Data
US 2003/0028363 A1    Feb. 6, 2003

(30) Foreign Application Priority Data
Jan. 3, 2000  (EP) .................................. 00480001

(51) Int. Cl.
*G06F 15/16* (2006.01)
(52) U.S. Cl. ................. 709/203; 709/227; 719/317
(58) Field of Classification Search ............ 709/225, 709/229, 231
See application file for complete search history.

(56) References Cited

U.S. PATENT DOCUMENTS 6,212,535 B1 *   4/2001   Weikart et al. ............. 709/206
6,523,067 B2 *   2/2003   Mi et al. ..................... 709/229

(Continued)

FOREIGN PATENT DOCUMENTS

EP      0 813 133       12/1997

(Continued)

OTHER PUBLICATIONS

A. Erni et al., Generic Agent Framework for Internet Information Systems; Jul. 1998; Proceedings of IFIP WG 8.1 Conference 98; Bejing, China; 17 pages.*

(Continued)

*Primary Examiner*—Patrice Winder
(74) *Attorney, Agent, or Firm*—Milde & Hoffberg, LLP

(57) ABSTRACT

A process allowing communication between a java code and an executable software file which permits the java code to receive an access to the internal system resources of the user's computer. The java code is arranged to be configured as a server in the client's configuration, by means of the establishment of a server socket communication channel. Once established, that socket communication channel is used for allowing a full ordered, error-free communication between the java code and the local executable file, thereby allowing the java code to take profit of the internal system resources of the user's computer. Preferably, the java code is received by the user through an Internet/Intranet network as an applet which thus receives an effective and powerful access to the system resources of the user's machine.

12 Claims, 8 Drawing Sheets

U.S. PATENT DOCUMENTS

| | | | |
|---|---|---|---|
| 6,526,041 B1 * | 2/2003 | Shaffer et al. | 709/203 |
| 6,546,546 B1 * | 4/2003 | Van Doorn | 717/114 |
| 6,658,573 B1 * | 12/2003 | Bischof et al. | 726/17 |
| 6,802,061 B1 * | 10/2004 | Parthasarathy et al. | 717/173 |
| 6,880,083 B1 * | 4/2005 | Korn | 713/170 |

FOREIGN PATENT DOCUMENTS

| | | |
|---|---|---|
| EP | 0 833 133 A2 * | 12/1997 |
| EP | 0 817 103 | 1/1998 |
| EP | 0 878 759 | 11/1998 |

OTHER PUBLICATIONS

Berg, C: "How Do I Create a Signed Applet?", Dr. Dobb's Journal, Aug. 1997, Miller Freeman USA, vol. 22, No. 8, pp. 109-111, 122.

"Platform Abstraction Of Input Method Using Proxy Server", IBM Technical Disclosure Bulletin, U.S., IBM Corp. NY, vol. 40, No. 4, Apr. 1, 1997, pp. 83-84.

* cited by examiner

PROCESS OF COMMUNICATION BETWEEN AN APPLET AND A LOCAL AGENT USING A SOCKET COMMUNICATION CHANNEL

TECHNICAL FIELD OF THE INVENTION

The invention relates to the information technology and more particularly to a communication process between an applet and a local Agent using a Socket communication channel.

BACKGROUND ART

With the continuous progress of computer systems and the development of the Internet/intranet networks, each customer in the world is provided with an access to a wide range of information and services. As new applications are being discovered, the interaction between the Internet network, and more particularly the applications running into a service provider's computer and the user's computer located elsewhere in the network needs to be enhanced and developed.

Each computer is fitted today with an information access/management tool such as a browser, for instance Netscape manufactured by Netscape Inc., or Internet Explorer (manufactured by Microsoft Corporation of Redmond, Wash., U.S.A.) for providing an access to the Internet network and which constitutes the heart of the interaction between the latter and the user's machine. The interaction between the Internet applications and the user's machine is continuously enhanced by means of so-called plug-in code which enriches the browser, and provides the latter with new functions and new capabilities, for instance for taking benefit to the multimedia resources of the user's computer. Java script code is generally used for that purpose, and introduced in a Hyper-Text Mark-up Language (HTML) page received by the browser. If the java script code refers to one plug-in code, which appears to be missing in the local machine, then the browser is controlled so as to download the missing reference and be enriched with the corresponding new functionality. For security reasons, any java script code downloaded through the Internet, as well as any java code, receives no direct access to the internal system resources of the user's machine. In no way the access to the hard disk directories is being allowed. As soon as the plug-in has been installed, the browser may load and run it in relation with the particularly HTML page being processed.

Although plug-in codes appears to be quite effective for adding new capabilities to a basic web browser, it is clear that they present a main drawback since they closely depend upon the operating system, and also the particular web browser which is run in the computer. This is a drawback since it increases the work of the Internet application designers who have thus to develop and maintain a wide set of plug-in libraries.

A second solution known in the art permits the development of software code appearing, in a certain extent, more independent on the particular operating system which is running in the user's computer. This is based on the use of java code which closely interacts with the web browser.

In the more recent versions of the known web browser, i.e. Netscape rel. 4 or Internet Explorer 4, there is provided a layer which allows the processing of signed objects (such as java code, javascript, active X for Internet Explorer . . . ) with an appropriate signature process which is different for each navigator. Those versions of the navigators become capable of receiving signed applets in the HTML pages, and thus expand and enhance the possibilities of the basic java code which is downloaded through the Internet network. As known by the skilled man, the java code is portable and can be executed in any machine, and particularly any browser provided that a java interpreter is therein available. However, the java code which is contained into an applet is not allowed to access to internal system resources of the user's computer (including accessing the directories on the hard disk, and initiating Internet connections etc . . . ), so as to prevent any malevolent intrusions in the user's machine. With the new versions of the browsers which were evoked above, the java code is given such a possibility to operate in an unprotected mode, when the latter however appears to be signed with an electronic certificate being granted by a certification authority, such as Veri-Sign, thus garanteing the origin of the java code. Further, prior to the execution of the signed applet code by the browser in an unprotected environment, the formal agreement of the user is requested.

In order to give access to the internal resources of the computer, such as audio capabilities and particularly the control of the recording mode and the adjustment of the recording level, some known solutions use a native code which is associated with the java code. The communication between that java code and the native code is achieved by means of an interface which is, in the case of Netscape for instance, the Java Native Interface included into that browser.

In this second known system, the native code is installed as follows. When the user wishes to receive one HTML page containing a visible reference to a java code—concretely the URL address and the reference of the file to be downloaded—the web browser fetches the latter at the specified addresses. The downloaded file is generally an aggregated file (generally archive jar or archive.cab in accordance with the particular web browser) containing all the files (.class) which are needed for the execution of the java code, and which is automatically downloaded by the web browser, and being executed in the virtual machine. In the case of a signed java code, a dialog box is displayed to the user in order to ask him to accept or reject the execution of the applet code with some extended capabilities. Once accepted, the java code is given the possibility to download an executable file, for instance a dynamic link library (dll), which provides the access to the desired audio resources. It should be noticed that all operations mentioned above, and the executable file, as well as the java code itself, still closely depend upon the communication interface between the applet and the native code, that is to say, finally, the web browser.

The second solution which was briefly evoked above, based on the use of applet interacting with the web browser, certainly improves the portability of the code compared to the known plug-in techniques. However, it is clear that even in that improvement, the native code and the applet still remains closely dependent on the particularly web browser which is being used, what obviously refrains the general portability of the java code when associated to a native code.

Therefore, when considering the known techniques, be it the plug-in or the java code interacting in close relationship with the web browser, it appears a need for improving more the situation and enhancing the independence of the java code with respect to the user's platform specification, as well as the independence of the native code with respect to the web browser.

SUMMARY OF THE INVENTION

It is an object of the present invention to provide a new architecture which permits easier development of java code and native code having access to the internal resources of an user's computer.

It is another object of the present invention to enhance the cooperation between a java applet with local executable files, which said java applet remaining substantially independent on the particular web browser which is used in the user's computer.

It is a further object of the present invention to enhance the universality of the applet codes when associated to native codes.

It is still another object of the present invention to provide the association of an universal java code with a native code or agent being downloaded during the first connection to a service provider, so as to permit an access to internal resources of the computer, whatever the browser being installed.

It is another object of the present invention to provide an easy way of garanteeing the integrety and origin of files being downloadable through web or file transfer protocol servers.

It is a further object of the present invention to provide a process for automatically distributing a public key by embodying them into the archive file(s) of a signed applet.

These objects are achieved by the present invention which is defined in the independent claim 1. Basically, there is provided a process allowing communication between a java code and an executable software file which permits the java code to receive an access to the internal system resources of the user's computer. The java code is arranged to be configured as a server in the client's configuration, by means of the establishment of a server socket communication channel. Once established, that socket communication channel is used for allowing a full ordered, error-free communication between the java code and the local executable file, thereby allowing the java code to take profit of the internal system resources of the user's computer.

In one embodiment of the invention, the java code is an executable java code installed by means of traditional installation procedure, such as a CDROM for instance.

However, in a preferred embodiment of the invention, the java code is received by the user from a web or File Transfer Protocol (FTP) server through an Internet/Intranet network, whereby the applet receives an effective and powerful access to the system resources of the user's machine.

In one preferred embodiment, the java applet code is installed by a browser which detects a reference to one signed java applet code into a HTML page. The installation of the applet causes the downloading into the user's machine of a local executable Agent file when the latter does not yet exist in the users' files. The applet then requests the creation of a socket communication channel for the purpose of establishing a communication channel with the executable Agent file. When the communication port is being granted, the applet then launches the Agent with the known port. An interesting advantage is that not only the java applet code becomes substantially independent on the particular web browser being involved, but also is the local executable Agent code. Maintenance is thus substantially facilitated.

Preferably, the Agent executable file is being downloaded only when the more recent version does not appear in the user's machine file system.

The invention is particularly adapted for the use of java applet code which takes benefit of the multimedia capabilities of the user's computer, and more particularly the audio capabilities of the latter. With the arrangement of the invention, the applet code gets the access to the basic audio functionalities, such as the control of the recording mode, the adjustment of the recording level etc . . . .

Preferably, the applet uses a cache mechanism for allowing the local storage of the files being downloaded from the Internet/Intranet network or being transmitted to the Internet network. In one embodiment, the cache mechanism is used for caching the audio message files of an audio forum discussion application.

In one embodiment, the Agent execution file is processed by a signature mechanism which ensures the integrity of the latter file. Preferably, the signature process is based on the signature process of the downloaded signed java applet.

The invention also provides a process for enhancing the security of the files being downloaded from a service provider through a Internet/Intranet network Indeed, when a HTML page contains a reference to a java applet which is signed, the browser causes the downloading of the applet archive files which are arranged to contain a public key which will be subsequently used for ensuring the integrity of subsequent downloaded files. Therefore, since the signed applet takes use of the signature processing mechanism which guarantees the origin and the integrity of the files, the service provider may take advantage of that public key for ensuring the integrity and origin of any subsequent downloaded files, thus substantially increasing the security of the Internet connection, and preventing from damage that would cause web server hacking. It should be noticed that that integrity and authentication mechanism can be used independently from any existing socket communication channel, and therefore for any file, be it an executable file or a file containing sensitive data that should remain unaltered.

DESCRIPTION OF THE DRAWINGS

An embodiment of the invention will now be described, by way of example only, with reference to the accompanying drawings, wherein.

DESCRIPTION OF THE PREFERRED EMBODIMENT OF THE INVENTION

Figure 1:
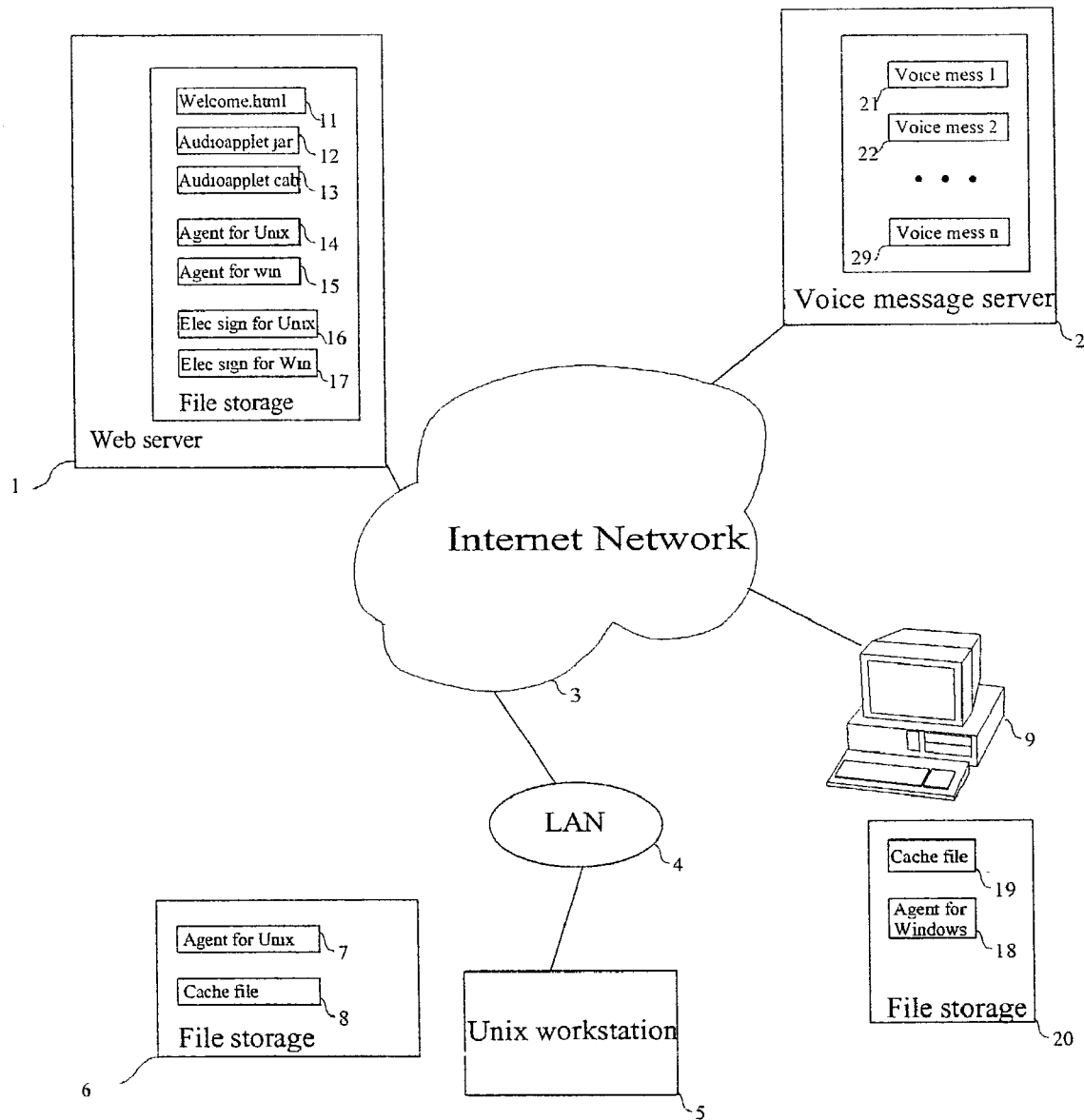
FIG. 1 illustrates the general architecture of one preferred embodiment of the invention in an audio application available through an Internet network.

With respect to FIG. 1 there is shown an example of the basic architecture well suited for an audio application, such as a discussion forum on the Internet/Intranet network. It is however clear that any audio application can be contemplated and take benefit of the present invention. A web server 1 is connected to an Internet network 2 for instance and is associated with a voice message server 2. Web server 1 and Voice message server 2 are represented in FIG. 1 as being two separate entities but may however be embodied into a same server attached to the Internet network. Web server 1 has a file storage which comprises a certain number of downloadable files, for instance a welcome page 11 formatted in Hyper Text Mark-up Language (HTML) format, and additional files which are designed to fit some typical platforms, for instance an Unix platform or a Windows platform (such as Windows 98 marketed by Microsoft Corp. of Redmond, Calif. USA). Regarding the Unix platform, the file storage of web server includes a downloadable audioapplet file 12, a downloadable executable Agent 14 designed to operate on an Unix platform, and an optional electronic signature module 16. Similarly, the file storage of Web server 1 includes downloadable audioapplet 13, a downloadable executable Agent 15 and an optional electronic signature module 17 adapted to the Windows platform. As will be described below, the two optional signatures are used for ensuring the integrity of any files being downloaded from the web server to the user's computers.

FIG. 1 also shows a Voice message server 2 which is separate from the web server 1 and has a file storage being used for storing the different voice messages involved in the audio application (voice messages 21, 22 and 29 are represented in that figure).

Web server 1 can process connection requests from different working stations or platforms comprising a computer, for instance an Unix workstation 5 connected to the Network via a Local Area Network (LAN) 4. Workstation 5 has a mapping storage file which includes a first portion 7 dedicated to receive the downloadable version of the local executable Agent for Unix, and a second portion which is a cache 8 which will be used for storing the audiomessages processed by the application.

Web server 1 may also receive the connection from a multimedia PC platform 9 loaded with the Windows operating system. PC platform 9 is connected to the Internet network by means of a (not shown) modem and further comprises audio features allowing the reading and recording of audio files or sequences. PC platform 9 has a file system which includes a first portion 18 for loading the downloadable executable Agent software, and a second portion 19 receiving a cache mechanism for the audio messages files processed by the audio application.

While the invention will be particularly described in reference with an audio application, it should be noticed however that the skilled man may straightforwardly adapt the teaching of the present invention to suit any other applications: video application, video conferencing, virtual reality etc . . . .

It will now be discussed how a java applet code, which is an audioapplet in that situation, be installed into the user's computer and receives a complete access to the internal audio-resources.

Three particular processes are involved for that purpose: a first process executed by the web browser for achieving the installation and the proper launching of the applet; a second process carried out by the applet for installing and launching the local Agent software; finally, a third process which is executed by the local Agent executable file.

Figure 2:
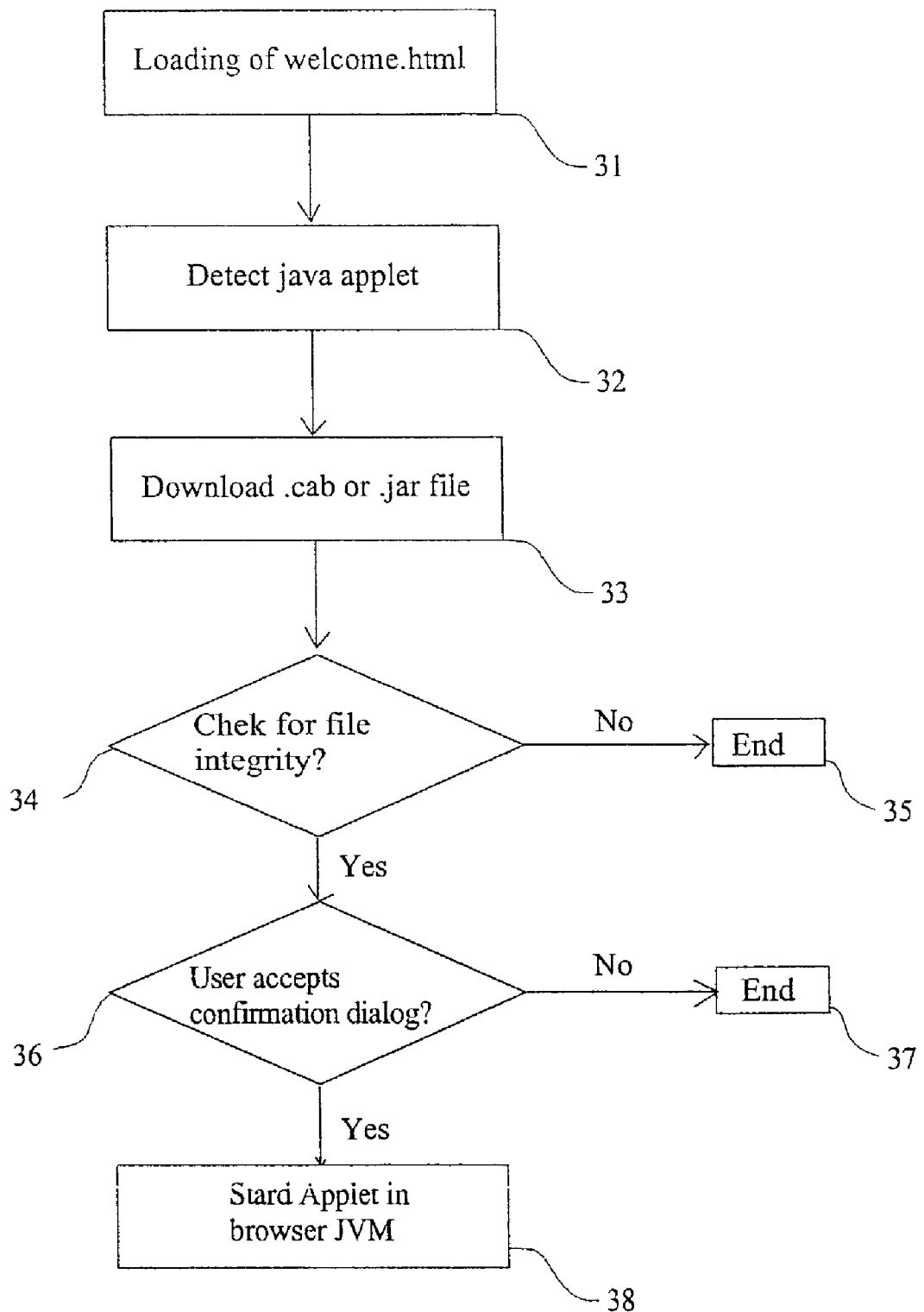
FIG. 2 is a diagram illustrating the installation and launching of the signed applet by the web browser.

The first of the three processes—the web browser process—will be particularly described in reference with FIG. 2. The user's platform which is connected to web server 1 first receives a welcome.html page 11, which is loaded in the web browser, step 31.

The welcome page may contain a reference to an audio java applet which requires the access to the audio capabilities or resources of his computer. Such a reference appears as follows:

```
Wimba/pct
<APPLET align=baseline
    name=audioApplet
    code=com/wimba/client/gui/main/Interface.class
    height=1 id=forums width=1
    archive = audioApplet.jar viewastext>
        <PARAM NAME="cabbase" VALUE="audioApplet.CAB
        </APPLET>
```

As known by the skilled man, in accordance with the platform which is considered—respectively the Unix platform 5 and the Windows platform 9, the audioapplet.jar or audioapplet.cab files will be considered.

When the web browser detects the existence of that reference into the welcome.html, the latter is decoded as being the call to a java applet, step 32. The browser then investigates within its cache files in order to determine whether the files being involved by the considered applet are already available. Such a situation can occur when the user has already been connected to the current service provider and has processed the considered HTML page. If the files are not available in the cache, then the browser causes, in step 33 of FIG. 2, the downloading of the latter (either audioapplet.jar 12 (in case of Netscape) or audioapplet.cab 13 (in the case of Internet Explorer) in server 1) at the address which is defined at the applet tag. This downloading is achieved in accordance with the well known Hyper Text Transfert Protocol rules and will not be further elaborated on.

The process involves a java applet code which is signed and step 34 causes the checking of the integrity of the archive file (either audioapplet.jar or audioapplet.cab in accordance with the particular platform being considered). The signature of those files is based on the certificate that is delivered by an authentication autority, such as Verisign). The certificate is included in the downloaded file and contains the name of the company. Only the company can sign a file like that because it knows some secret elements that have been delivered by the authentication authority. In one particular embodiment, the archive files further comprises a specific file which is used for the purpose of loading a public key which will be used at a further step, during the execution of the applet when the latter will cause the downloading of subsequent data or executable files, as will be explained hereinafter with more details.

In the case of failure of checking step 36 the file is rejected because it has been corrupted and the process is being terminated at step 35.

Then a dialog box is displayed to the user in step 36 so that the latter may confirm his agreement on the assignment of extended capabilities to the java applet.

If the user rejects the authorization for extended capabilities for the applet, the process may be terminated on step 37. It should be noticed that in some embodiments, it may be decided that the process will continue but, however, it will be subject, in that case, to a "SecurityException" java exception when any operation requiring a non permitted capability is being requested.

Conversely, in the case of agreement by the user, the java applet is given the possibility to perform any operation within the frame of the authorization rights being granted by the user and may, therefore, complete the full processing. More particularly the applet is running in the frame of a Java Virtual Machine (JVM) which is arranged and controlled by the browser. Within the JVM, a particular object—the Security Manager—is given the responsibility for controlling the extended capabilities assigned to the applets. If the applet is not signed, the latter will be given no access to the system resources, for instance to a system file or for initiating a network connection with any computer. In the reverse case, the signed applet may receive some of these privileges or rights specified by the software programmer at the creation of the archive program. Consequently, each time the execution of one applet requires some extended capabilities or privileges, the Security Manager object is consulted and accepts or refuses the action being requested, taking into consideration how the applet was signed and if the user accepted to grant those capabilities.

When the confirmation of the user has been received in step 36, then the process proceeds to step 38 where the web browser launches the applet in the java virtual machine.

With respect to FIG. 3, there will now be described in detail the particular execution of the java applet.

A first step 41 is involved which allows the determination of the current operating system which is running in the user's computer. For that purpose, the applet calls the routine "System.getProperty ("os.name") and the System.getProperty ("os.arch") in order to be communicated the system properties defining the user's computer and the current operating system: e.g. a SUN computer, a PC computer loaded with the Windows operating system, a PC loaded with Linux, the Macintosh of Apple Computers Inc., etc . . . .

Then, step 42, the java applet code which has received privilege to access the file system determines whether its local Agent executable code is already existing in the storage system. This is achieved by detecting the existence of a predetermined file in one particularly directory, which depends upon the category of machine which was previously determined.

If the Agent executable file appears to be existing in the file system, the release version of the Agent code is being detected in step 43, in order to determine whether the file system contains the more recent version of the Agent executable file. In some embodiments, the release version can appear in a separate Version file loaded in the same directory that the Agent executable code. In the server side, the release version can appear as a file which can be served by the web server 1. To check if the last version of the agent is being installed in the file system, the applet may download the release version file that is associated with the Agent file. This can be achieved by means of an appropriate HTTP get-request command. By comparing the downloaded version file with the local existing version file, the java applet may determine whether a further downloading of the Agent executable code appears appropriate.

The last version of the Agent executable file can then be optionally checked in step 44 for the purpose of checking integrity. This is an optional step which is used for ascertaining the security of the downloaded file. In one preferred embodiment, that security mechanism can be advantageously be based on the signature process of the java applet code itself. Indeed, as will be described below with more details, this integrity check may use an asymmetric encryption algorithm such as Rivest Shamir Adleman (RSA) asymmetrical encryption mechanism based on a private and public key. As will be explained hereinafter with details, the public key is being incorporated into a specific file and the latter is incorporated within the signed applet archive files, thus taking benefit of the integrity brought by the signature process of the latter.

If the integrity test of step 44 fails, the process proceeds with step 46 since the Agent file appears to be corrupted. It has been corrupted in the user file system and needs to be downloaded again. In the reverse case, conversely, the file integrity is being ascertained and the process proceeds with step 50.

If the Agent executable code appears to be absent from the system files (output of step 42), or if the current version of the existing Agent executable code appears to be out of date (what is detected by downloading the Version file from the server and comparing it to the existing current Version file in step 43), the applet launches in step 46 the downloading of the last version of the Agent executable code associated with the considered computer platform. The downloading of the Agent executable code, and possibly the associated Version file, is achieved by means of a get_request operation to the service provider where is located the file in accordance with the known HTTP protocol rules. Such rules are well-known to the skilled man and will not be detailed further.

A optional file integrity checking step 47 is then performed which is similar to that carried out in step 44, for the purpose of checking the integrity of the Agent executable file. In case of failure, the process goes to termination step 48 and, conversely, both the downloaded Agent executable file and the version file are saved in the harddisk in step 49. The process then proceeds with step 50.

It should be noticed that the Agent executable code closely depends upon the particular platform being considered. However, as it will appear from the following developments, the size of the Agent code is relatively small and, further, only four different executable codes are required for covering most configurations existing in the world. The invention will be hereinafter detailed in reference with the well-known PC platform based on the Windows operating system manufactured by Microsoft Corp., although it should not be limited to the latter.

In step 50, the java applet requests the establishment of a Socket communication channel with the Agent executable code). By using a socket communication channel—normally reserved for organizing a server application—the downloaded applet receives a server configuration and the capability of accepting communication establishment requests with its associated local Agent file. More particularly, this Socket has the effect of providing an ordered, error-free Open System Interconnection (OSI) layer 4 transport communication channel which will be used by the Agent code and the Applet as will be described hereinafter.

The establishment of the Socket communication involves the searching by the applet of a free port and the creation of the socket, step 50. This can be achieved by means of the following appropriate java command:

ServerSocket ss=new ServerSocket(0)

The port on which the applet is listening can be known by calling the following command (requiring a privilege with respect to the signature process of the applet)

int agentPort=serverSocket.getLocalPort( )

Figure 3:
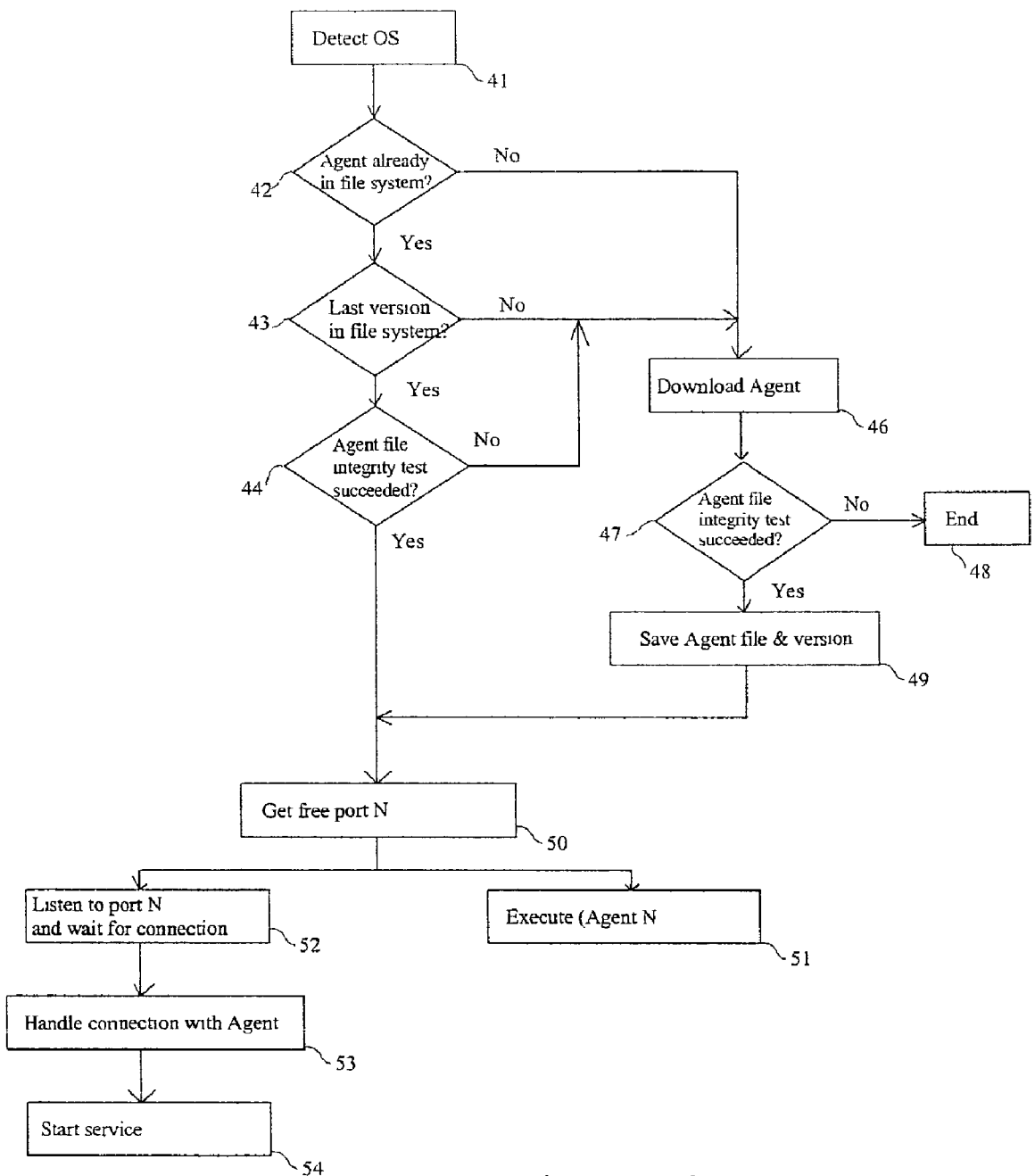
FIG. 3 is a flow chart illustrating the execution of the applet requiring access to the internal resources of the user's computer.
Figure 4:
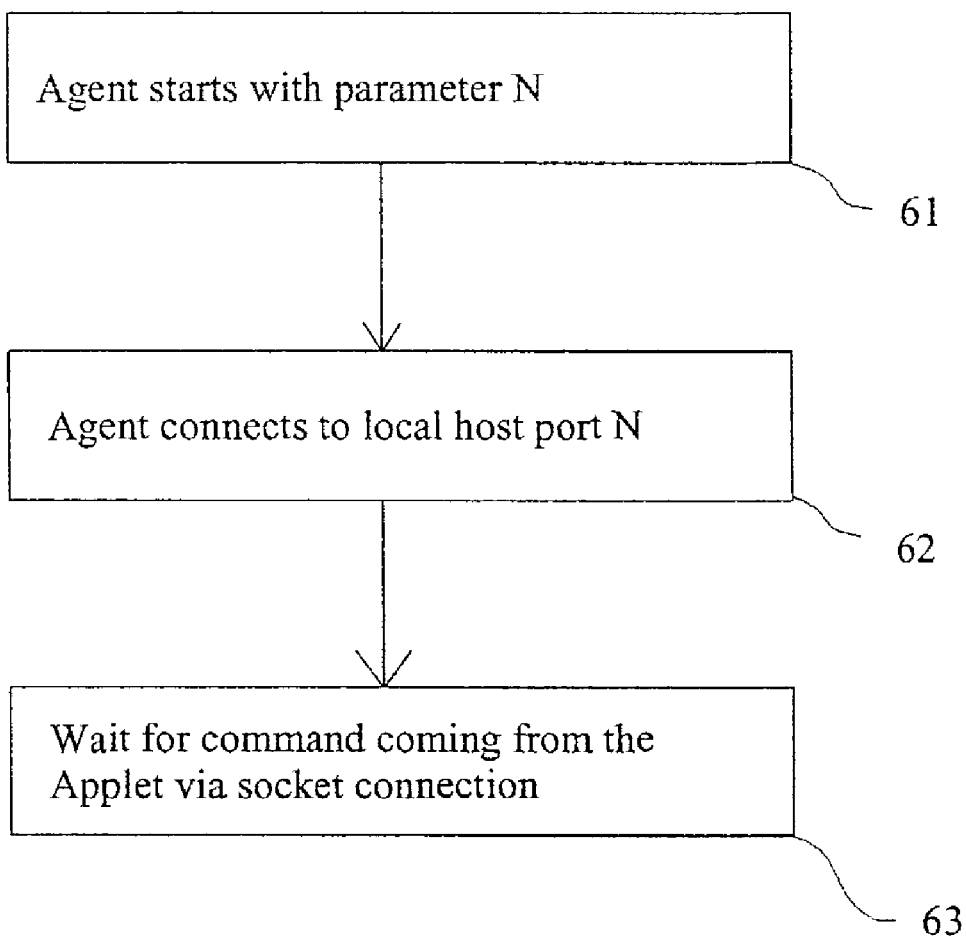
FIG. 4 shows the Agent process for establishing a socket connection with the java applet.

Two separate and parallel execution threads are then initiated: the processes of steps 52-54 of FIG. 3, and the process executed by the Agent as represented in FIG. 4 and launched by means of step 51 will now be discussed.

With respect to the first thread, it can be seen that in step 52, the java applet listens to the port which was granted until it receives a request for a connection through this port. This is achieved by means of the command:

Socket newSocket=ss.accept( )

The first execution thread waits for a connection request to continue as will be shown hereinafter, such a request may occur from the Agent once the latter will be launched with the appropriate parameter.

Upon the establishment of the connection with the local Agent, that connection will be handled in step 53 and be used for providing the desired service in step 54.

Regarding the second execution thread, in step 51, it can be seen that, in parallel with the listening step 52 in FIG. 3, the applet code simultaneously launches the independent program of the Agent executable code with the appropriate value of the port—ie the agentPort—as a parameter, in step 51:

Runtime.getRuntime( ).exec("pathAgent agentPort")

Where pathAgent is the location of the Agent in the file system plus the file name of the agent itself. It should be noticed that this path may vary in accordance with the platform being considered. As previously, the launching of the executable Agent requires a privilege (which the Applet has normally received).

The process being executed by the Agent will now be described with respect to FIG. 4.

Step 61 represents the launching of the Agent with the appropriate agentPort parameter. Then, in step 62, the Agent tries to initiate a connection with localhost on port agentPort that was specified as a parameter. The following command, in a Java programming style, may be issued for that purpose:

Socket socket=new Socket("localhost", agentPort)

Where localhost refers to the machine where the service is running and thus the machine where the applet is running.

The Agent then enters in a waiting step 63 where it waits for the commands coming from the java Applet (issued in step 54 of FIG. 3). The applet can then fully take advantage of the established socket communication channel for providing the service of step 54, and for getting an access to the internal resources of the user's computer.

It should be noticed that the examples of java instructions given above are only examples of java code which, when compiled, can take profit of the technical effect resulting from the direct access of the internal resources of the user's machine for a java program. The invention should not be limited to the sole frame of a Java Virtual Machine, but can apply to any program written in java code.

The remaining part of the description will show an example of a possible use of that socket communication channel for the purpose of allowing an effective audio control of the multimedia computer. With this arrangement, the applet may take benefit, via the agent executable file, of the audio library which is available through the operating system. Considering for instance a Windows platform, the Operating System (OS) provides an access to the audio device drivers and, more particularly, to the following known functions:

waveInOpen( ): for preparing the recording device;
waveInStart( ): for launching the recording;
waveInStop( ): for stopping the recording;

The audio applet can access to these functions by means of the established socket communication channel as explained above. For the sake of clarity, these are non exhaustive examples of requests which can be issued by the audio applet to the Agent;

PrepareForCapture: for requesting to the Agent to prepare the recording device, ie to issue the above mentioned waveInOpen( );

StartCapture: for requesting the Agent to issue the command waveInStart( ) for launching the recording;

StopCapture: for stopping the audio recording;

GetCaptureVolume: to request the gain volume in a range between 0 and 100;

SetCaptureVolume: to control the gain in a range between 0 and 100;

PrepareForPlayback: for request the Agent to prepare the playback of the recorded wave file;

Playthat: request inserting the audio data into the buffer containing the data to be played;

PausePlayback: request the Agent to issue a pause command to the OS;

GetPlaybackVolume: request the play volume level (range 0-100);

SetPlaybackVolume: request for adjustment of the volume level (range 0-100)

GoodBye: end of connection with the Agent

Conversely to the above examples of requests issued the Applet, here are examples of information which can be issued by the local Agent, and forwarded to the java applet code via the socket communication channel.

Figure 5:
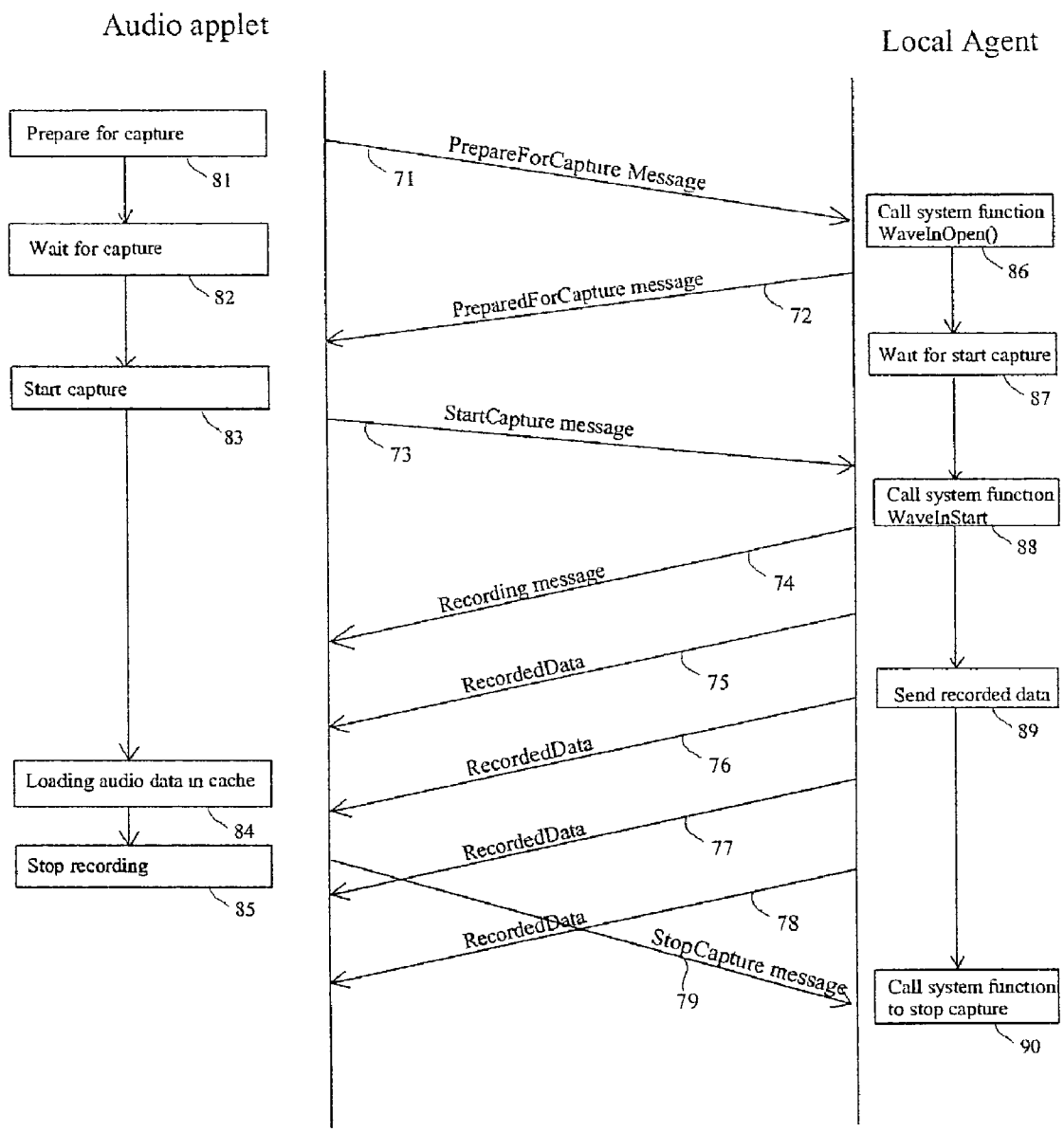
FIG. 5 is a flow chart illustrating the different messages which can be exchanged between the java applet and the local executable Agent via the socket communication channel

PreparedForCapture: Agent being ready to record;
Recording: Agent recording;
RecordedData: samples of audio data being recorded.
PreparedForPlayback: Agent being prepared for playback;
PlayedChunck: the piece of audio file being played;
DryDevice: the buffer containing the audio files to be played is empty;

FIG. 5 is a flow chart illustrating the use of the communication socket channel for the desired service step 54 of FIG. 3 and more particularly, in the case of the audio applet application, the different messages which can be exchanged between the audioapplet and the local executable Agent.

When the audio applet wishes to request the local Agent to prepare for an audio capture, in step 81, the former transmits to the latter a corresponding message (reference 71) and waits for the acknowledgement, in step 82. The Local Agent thus calls the corresponding system function in step 86 which is, in that situation, the routine WaveInOpen( ) and then acknowledges the request with a PreparredForCapture message as represented by arrow 72.

Upon the reception of the PreparedForCapture message, the audio applet may then issue a start capture message, in step 83, which is forwarded via the socket communication channel as represented in reference with arrow 73. The local Agent which was in a waiting state 87, then receives that message and calls the corresponding routine WaveInStart, in step 87. It then issues a Recording message which is forwarded to the audio applet via the socket channel, as shown in reference with arrow 74. The audio data stream is then successively generated by the audio is device and forwarded from the local Agent to the audio applet, as illustrated with reference to arrows 74, 75, 76, 77 and 78, and the corresponding packets of audio data are being loaded into the cache files, as shown in the applet process side, with respect to step 84. When the audio applet wishes to stop the recording process, in step 85, it issues a StopCapture message which is forwarded via the communication channel (arrow 79), thus causing the local Agent to correspondingly calls the Stop Capture system function to the Operating System, in step 89.

It therefore appears from the FIG. 5 that a powerful communication channel is being established between the audio applet and the local Agent executable code and that the java applet code is thus receiving a direct access to the system routines and functions of the operating system, whatever the particular web browser is being involved.

Figure 6:
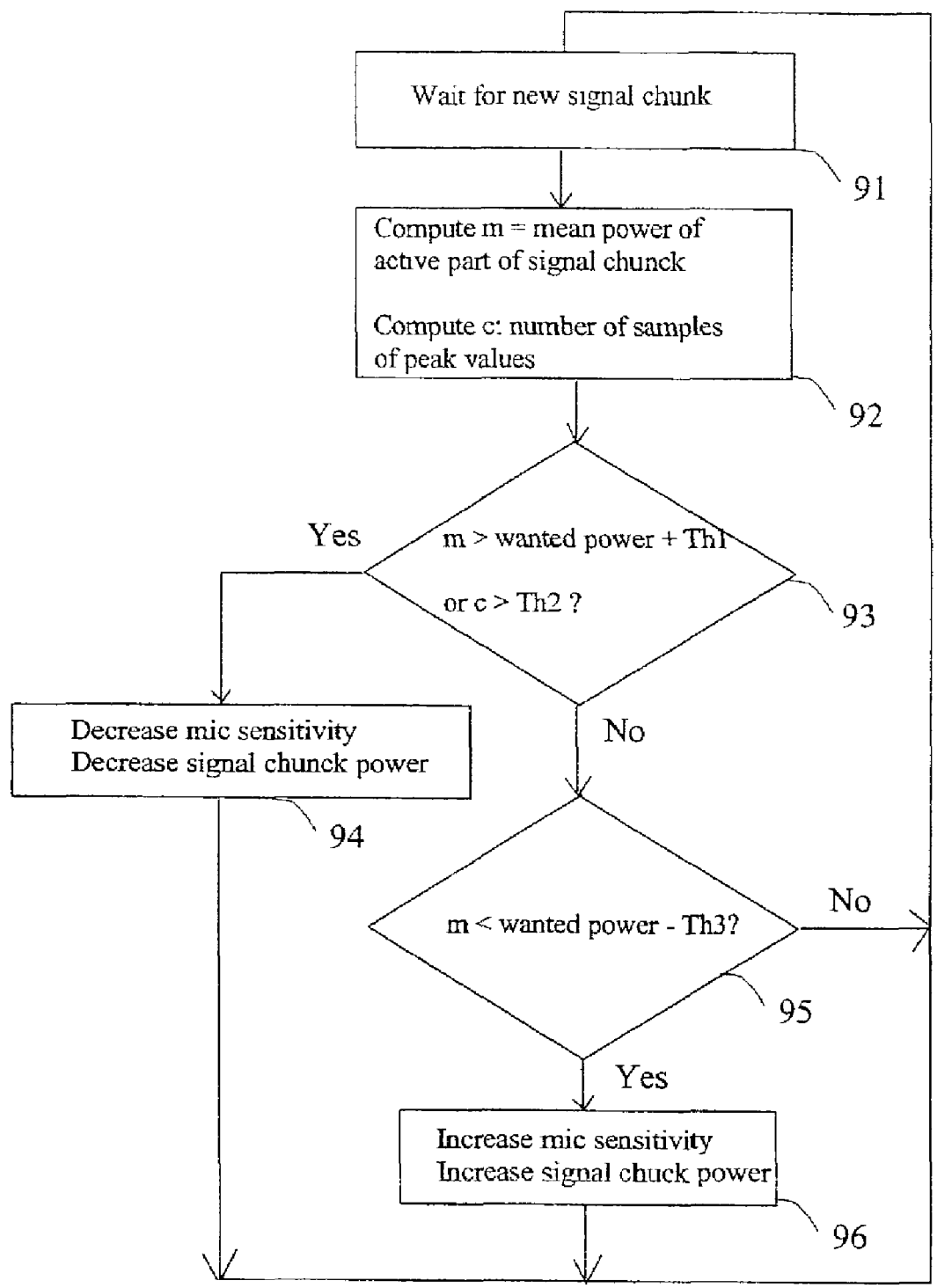
FIG. 6 illustrates a particular embodiment of the Automatic Gain Control used by the audio applet.

FIG. 6 illustrates one embodiment of the Automatic Gain Control process that can be used by the audio applet.

Indeed, it has been discovered that a substantial advantage results from the use of an Automatic Gain Control device based on two different controls: a first control which is directly operated on the microphone sensitivity, or more precisely on the level of the microphone input, and a second control which is carried out on the signal chunck, that is to say on the audio samples in order to adjust the level of the power of the recorded signal. Those two adjustments are simultaneously performed during the recording of the audio messages in accordance with the algorithm shown in FIG. 6.

In the preferred embodiment of the invention, the audio signal is captured in Pulse Code Modulation (P.C.M.) format 16 bits at a sampling rate of 8 Khz.

In step 91, the process waits for the processing of a new signal chunck.

Then, in step 92, two elementary computations are being performed. The first one is directed to the evaluation of the mean power (parameter m) of the active part of the signal chunck, that is to say the signal which does not comprise any silence portion. Additionally, a second computing is being performing for evaluating the number c of samples of signal which has attained the maximum peak value.

In step 93, a test is determined whether either m is superior to a given value—practically the desired power level plus a first threshold Th1—or c is superior than a second threshold value Th2. If one of the two computed parameters exceeds the predetermined limits, then the automatic gain control process proceeds to step 94 where both the sensitivity of the microphone input and the signal chunck power are decreased. The process then proceeds with step 91 again.

Conversely, if one of the two computed values m and c does not exceed the predetermined limits, then the process proceeds with step 95 where the first computed value m is being compared to the desired power level less a third desired threshold value Th3. If m is inferior than that limit, the process proceeds with step 96 where both the microphone input sensitivity and the signal chunck power are being increased, and the process goes to step 91 again.

If m appears to be superior than the above mentioned limit, then the process proceeds with step 91 again which is the collection of a new set of samples to be processed.

The Automatic Gain Control algorithm described above shows the flexibility of the arrangement of the present invention since it becomes possible to give to one applet, such as an audio applet, a full control of the internal system resources of the user's computer.

With respect to FIG. 7, there will now be described the cache mechanism which can be used by the applet. In one embodiment of the invention, the cache permits to store the voice messages, either coming from the local recording process or transmitted by the voice message server 2 through the Internet network. As will be shown below, these cache files present the substantial advantage to reduce the traffic of voice messages which is exchanged via the Internet connection and reduce the latency for the user for the purpose of improving interactivity. For the same purpose, the local agent begins to play the audio data of a voice message as soon as some data is available. It does not wait to receive the whole message to play it. Again, when the user is recording a message, the local agent sends data to the applet that sends it to the voice message server while the user is still speaking. The applet does not need to wait for the end of the recording process to begin sending the recorded message.

Figure 7:
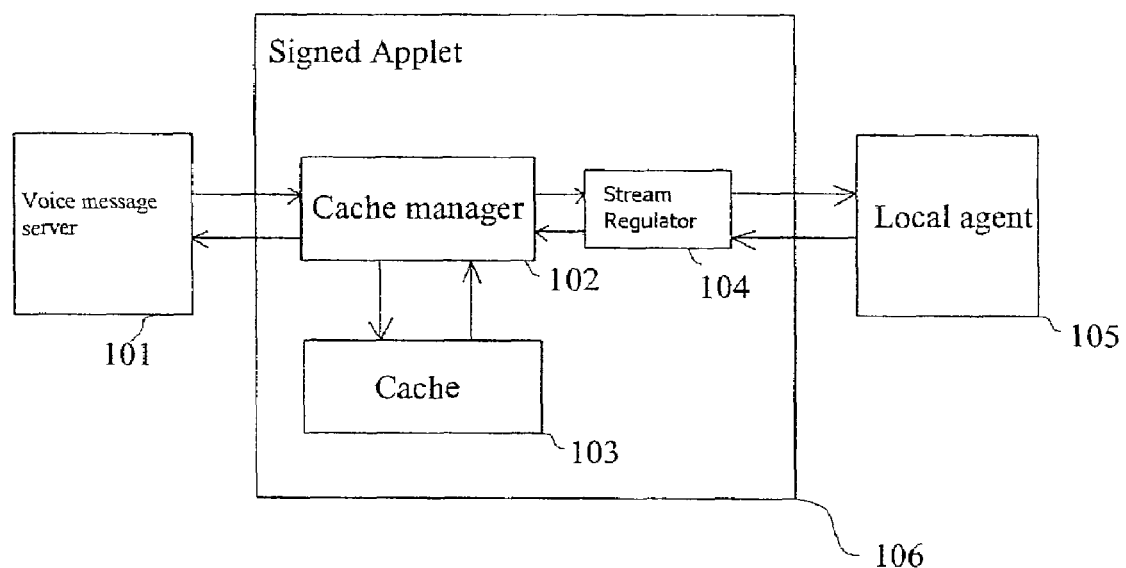
FIG. 7 shows the global architecture of the Cache mechanism that allows streaming from the voice message server to the local agent.

All these features are implemented in 3 objects forming part of the applet 106 and shown in FIG. 7: a CacheManager object 102, a Cache object 103, and a StreamRegulator object 104. The upper layer of the signed applet, containing the user interface, sends commands to the CacheManager object 102: play(MessageId), record(MessageId), stop( ). The CacheManager gets and sends data to the Voice Message Server 101, the Cache object 103, and the StreamRegulator object 104. Cache object 103 stores and reads data in the file system of the user's computer, while StreamRegulator object 104 is responsible for giving audio data to the local agent 105 via the socket communication channel at the right speed. Effectively, data coming from the Cache or network do not come at the speed they are played and a regulation process is needed to give the data to the local agent at the right encoding rate.

The particular process of playing a message will now be discussed. When the user asks to play a message, the command play(MessageId) is sent to the CacheManager object 102. The CacheManager calls the method isInCache(MessageId) of the Cache object. In case the method returns true, the CacheManager object 102 sends a getMessage(MessageId) to the Cache object 103. This results in the streaming of audio data of the message MessageId from the Cache to the StreamRegulator object 104. In case the method isInCache returns false, the request getMessage(MessageId) is sent to the voice message server. This results in the streaming of the audio data corresponding to messageId from the VoiceMessage server to the CacheManager object 102 via the Internet network. Then, CacheManager object 102 sends in parallel the data to the Cache object 103 and to the StreamRegulator object 104. The Cache object 102 stores it in the user's file system while the StreamRegulator object 104 sends it to the local agent applying the regulation process, as will be explained in the next paragraph.

The StreamRegulator object 104 involves a buffer for storing the audio data received. The role of this object in this case is to give audio data to the local agent at the right speed that is the audio encoding rate. Effectively, if data come from the Cache, data will come too fast compared to the playback rate. Thus the buffer enables to store some data before sending it. The buffer in this case will fill until all the audio data are sent and then empty at the playback rate. If data come from the Voice Message server, it may also come too fast in which case the process is as described previously. But it can also come too slow. To be able to serve the local agent regularly until the end of the message, StreamRegulator object 104 computes the rate at which it receives data and given this result computes the amount of data that it needs to store in the buffer before beginning to send it to the local agent in order to have always data until the end of the message. If the data input rate slows before the end, the buffer may empty. In this case, the StreamRegulator object 104 stops sending data to the local agent, computes the bandwidth again and the data to put in the buffer before restarting and wait for these data to restart sending data to the local agent. The local agent in this case pauses the playback when no more audio data arrive and then resumes it when data come again.

The process of recording a message will now be described in detail. In this case, audio data come from the agent and is stored in the buffer involved by Streamregulator object 104. At the same time, the CacheManager object 102 takes data in the buffer, sends it to the Cache object 103 and sends it to the Voice Message server. If the encoding rate is faster than the network connection rate, data might arrive faster in the StreamRegulator buffer than they are taken by the CacheManager object 102 and this will result in a delay after the end of the recording to finish sending the data stored in the buffer. In the reverse case, the buffer is always empty and the whole message is sent when the user finishes to record it.

Therefore, it appears that the cache mechanism which is embodied with the cache object allows the applet to get a direct access to the message, and particularly to the streamed portions of the voice messages as soon as the considered voice message is being available in the cache. This substantially reduces the time required for getting an access to the message since no further transmission through the network is being involved. Further, the streamed portions of the message is being provided at a regulated data rate what enhances the processing involved by the audio devices. Additionally, during the recording process the voices messages are stored within the cache files and simultaneously transmitted to the server, so that the user can easily play again the message once recorded.

In addition to the cache mechanism, the preferred embodiment of the invention uses a particular mechanism for improving the security brought to the downloading process of the Agent executable file. Indeed, it appears particular appropriate to guarantee the integrity of the downloaded agent executable file in order to maintain the same level of security to the latter than to the signed applet. Web servers may be hacked and the files that they serve may be changed. Therefore the Agent execution code is subject to malevolent intrusions, and be substituted by another program. The latter might then be installed and launched in the user's machine and then cause irreversible damage. Another risk is masquerading: try to intercept requests to the web server and serve malicious files instead of the real files. The applet is signed to prevent such attacks and the signature guarantee the user that the file is really the file generated by the company that owns the certificate and that it has not been corrupted (authentication and integrity). Consequently, there is a security problem associated with the agent file. This problem may be generalized to any file downloaded from a source that can be hacked and preferably any file coming from web servers. There is a need to ensure integrity and authentication.

In one embodiment, this security may be brought by some well known integrity and authentication processes applied independently from the java signed applet.

However it has been discovered that the process may well take a substantial advantage from the use of the signed applet and the authentication mechanism which is thereto related. For that purpose, the following independent integrity and authentication checking process is applied on the Agent executable file. This integrity checking mechanism is based on the existence of the signed java applet and takes great advantage of the cooperation between the downloading processes which are successively achieved under control of the web browser and the applet.

Figure 8:
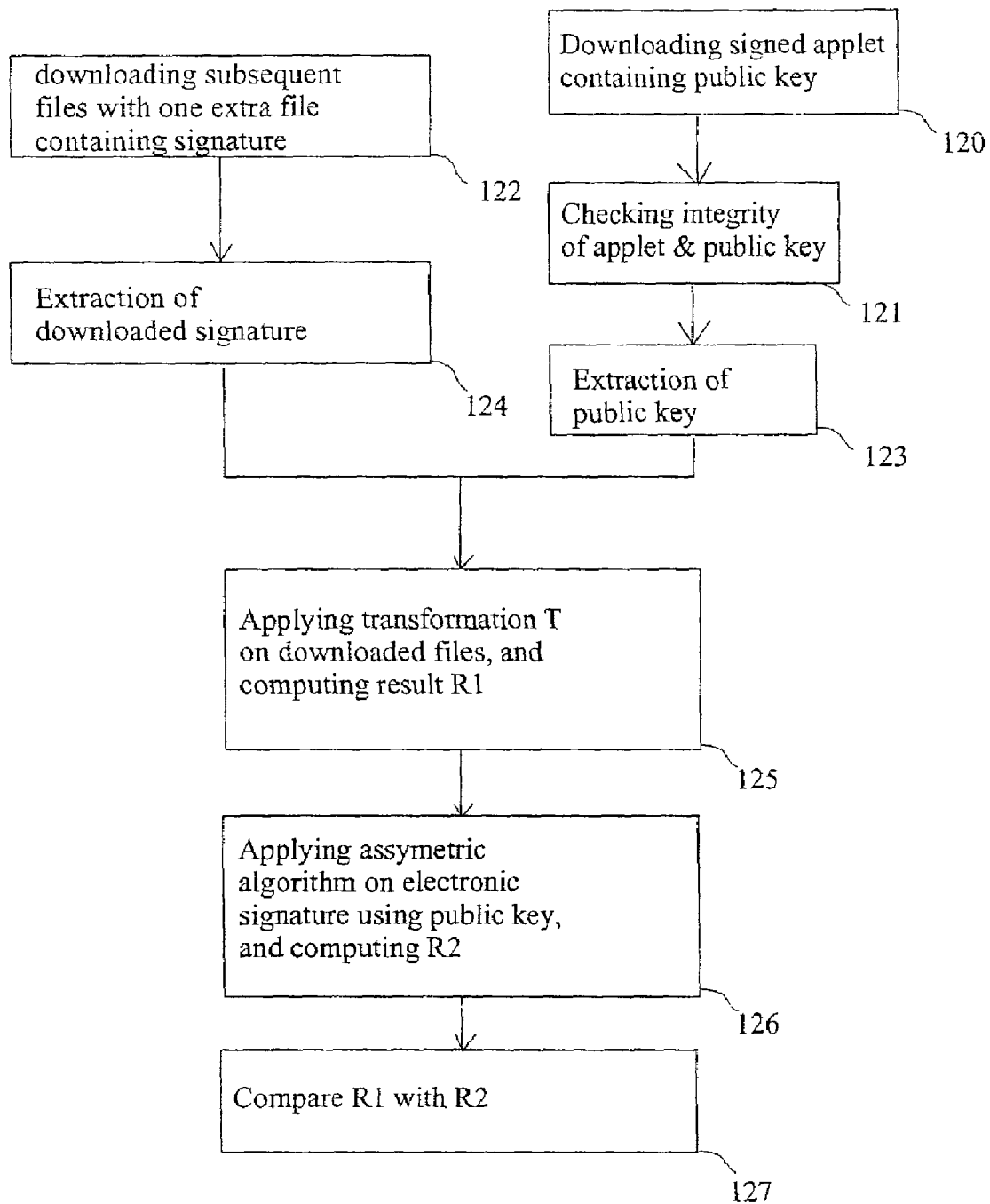
FIG. 8 illustrates the process for ensuring the integrity of the downloaded Agent executable file or any file that can be downloaded from a server.

FIG. 8 illustrates the process for ensuring the integrity of the downloaded Agent executable file in order to maintain the same level of security than that achieved for the java applet itself. In the preferred embodiment of the invention the Agent executable code is also subject of an integrity checking process. Indeed, as was previously described, the applet which is downloaded by the web browser in step 33 of FIG. 2 is signed, so as to ascertain the origin and integrity of the archive file (either .jar or .cab)

A secret signature file, such as a Message Authentication Code (MAC), is being included and associated to the Agent file being downloaded by the Agent. In one embodiment this secret signature is produced by means of an asymmetrical algorithm of the type Rivest Shamir Adleman (RSA), associated with a hash function such as MD4, MD5 or SHS. As known by the skilled man, asymmetrical encryption algorithms involve a private key and a public key. When encrypting a message with one of the two keys, the message is decrypted with the other. To choose encrypting with the public or private key depends on the security services you want to ensure: integrity, authentication, confidentiality etc . . . . Hash functions transform a message of any size into a message of fixed size with the following properties:

Two messages that are very close will have a significantly different result

It is very hard, given the result of the hash function to create a message that would have this result when applying the hash function.

Practically, the MAC electronic signature can be produced by successively applying the two following step:

Applying a transformation T which possibly involves a hash function on the Agent file in order to produce a result R1 having a fixed size. Should the Agent file have a reduced size, the T function may even be limited to a single basic function (even the identity one). In some situations it may be useful to involve the concatenation of the company's name with the basic hashing function;

Applying a RSA encryption on said result R1 with the private key associated to the RSA encryption processing, the private key being kept secret With respect to FIG. 8 there will be described the detail of the secured downloading process.

Step 120 corresponds to the downloading process of a signed java applet code. The archive .jar and .cab files contains an additional file comprising the public key associated to the asymetric algorithm (such as RSA) computation of the electronic signature mentioned above. In step 121, the signature process of the applet based on the company certificate delivered by an authentication authority such as Verisign permits to determine whether the received archive file containing the applet code, and the public key, has been subject of a malevolent intrusion via the downloading through the Internet network. If not, the public key can be extracted and is available for a future use by the java applet. This achieves a new and effective way for distributing a public key, the integrity and origin being guaranteed by the signature process of the signed applet archive file.

In step 122, the execution of the java applet causes the downloading of additional code or data file, such as the Agent file described above. It should be noticed that, in this embodiment, the Agent local executable code does not need to be encrypted. An electronic signature, e.g. a MAC signature, is introduced into a separate file which is downloaded with the Agent file or included in the agent file.

In step 124, the java applet causes the extraction of the downloaded electronic signature.

In step 125, the transformation T is applied on the local Agent execution code for the purpose of computing giving a first result R1. As mentioned above, transformation T may possibly involve a hash function or any equivalent function.

Then in step 126, the asymmetric decryption algorithm (such as RSA) is applied on the downloaded electronic signature with the public key, what produces a result R2. Thanks to the properties of the asymmetrical encryption algorithm, R1 equals R2 if the agent code and the electronic signature have not been changed.

In step 127, R1 and R2 can then be compared. The result of the comparison can then be used for determining whether the downloaded Agent file was subject of a malevolent intrusion or alteration.

While the integrity checking mechanism has been described in reference with the use of an Agent executable code allowing the establishment of a socket communication channel, it should be noticed that the latter is completely independent from such a socket communication channel.

Therefore, the process is useful for guaranteeing integrity and authentication of any kind of code or data file being downloaded by a signed applet.

What is claimed is:

1. Process for allowing access to a java applet code to native resources of a user's computer involving the steps of:
    giving said java applet code a digitally signed format to provide the applet with expanded capabilities;
    causing said java applet code to install a native local agent in the user's computer, said native local agent corresponding to code being directly executable on the local machine CPU, bypassing the Java Virtual Machine;
    creating a socket communication channel between said java applet code and said native local agent; and
    using the created socket communication channel for providing said java applet code with an access to said native resources.

2. Process according to claim 1, further comprising the following steps:
    detecting whether said native local agent is already installed into the user's computer and, if not, initiating said installation;
    installing a socket communication port by issuing a command socket to the operating system and receiving a free port N;
    launching said native local agent with the attribute of the received free port; and
    using said socket communication channel for the purpose of a multimedia application.

3. Process according to claim 1, wherein said java applet code is downloaded from a web server or a File Transfer Protocol (FTP) received through an Internet or Intranet network.

4. Process according to claim 3, wherein such process involves a mechanism for detecting whether said native local agent has an executable file which is already existing in the user's computer, and wherein the existing file is the more recent one.

5. Process according to claim 4, wherein the file comprising the digitally signed java applet code also includes a public key used by a an asymmetric algorithm associated with a hashing function for the purpose of ascertaining integrity of the subsequent downloaded files.

6. Process according to claim 1, wherein said native local agent allows access to audio system resources of said user's computer, so as to permit said java applet code to take control of recording functions of the computer.

7. Process according to claim 6, wherein said java applet code uses a Automatic Gain Control mechanism which simultaneously controls the sensitivity of the microphone input and processes the samples of digitized audio signal.

8. Process according to claim 1, wherein such process further involves a local cache mechanism which allows the regulation of the streamed audio data provided by audio devices and a direct re-access to voice messages which have already been downloaded by a voice message server.

9. Process according to claim 8, wherein the voice messages are recorded and are simultaneously transmitted to a remote server and stored within said cache mechanism while the recording process is going on.

10. Process of communication of a downloadable java applet code, which is to be run in a Java Virtual Machine of a web browser in a client system, with a native local independent agent, said method comprising the steps of:
    configuring said java applet code as a server by creating a socket communication channel for the communication between said downloadable java applet code and said native local agent; and
    using said socket communication channel for allowing communication between said java applet code and said native local agent.

11. Process according to claim 10, wherein said java applet code is downloadable from a web server or a File Transfer Protocol server through an Internet connection.

12. Method according to claim 10, wherein said native local agent code is a specific code for accessing to the internal resources of the client system.

* * * * *